(12) United States Patent
Manz et al.

(10) Patent No.: US 11,054,681 B2
(45) Date of Patent: Jul. 6, 2021

(54) DEVICE FOR OPERATING FUNCTIONAL ELEMENTS HAVING ELECTRICALLY CONTROLLABLE OPTICAL PROPERTIES

(71) Applicant: SAINT-GOBAIN GLASS FRANCE, Courbevoie (FR)

(72) Inventors: Florian Manz, Aachen (DE); Patrick Weber, Alsdorf (DE); Christian Effertz, Aachen (DE); Thorsten Dragas, Geilenkirchen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/630,222

(22) PCT Filed: Jul. 10, 2018

(86) PCT No.: PCT/EP2018/068606
§ 371 (c)(1),
(2) Date: Jan. 10, 2020

(87) PCT Pub. No.: WO2019/011891
PCT Pub. Date: Jan. 17, 2019

(65) Prior Publication Data
US 2020/0133042 A1  Apr. 30, 2020

(30) Foreign Application Priority Data

Jul. 12, 2017  (EP) .................................... 17180842

(51) Int. Cl.
*G02F 1/133* (2006.01)
*G02F 1/166* (2019.01)
(Continued)

(52) U.S. Cl.
CPC ............ *G02F 1/13306* (2013.01); *B60J 3/04* (2013.01); *E06B 9/24* (2013.01); *G02F 1/1334* (2013.01);
(Continued)

(58) Field of Classification Search
CPC .... G02F 1/13306; G02F 1/166; G02F 1/1685; G02F 1/1334; B60J 3/04; E06B 9/24; E06B 2009/2417; E06B 2009/247
See application file for complete search history.

(56) References Cited

U.S. PATENT DOCUMENTS

| 6,710,823 B2 | 3/2004 | Faris et al. |
| 8,102,586 B2 | 1/2012 | Albahri |
| 2017/0090224 A1* | 3/2017 | Vivier ............... B32B 17/10504 |

FOREIGN PATENT DOCUMENTS

| CN | 104965372 A | 10/2015 |
| DE | 10 2005 007427 A1 | 8/2006 |

(Continued)

OTHER PUBLICATIONS

International Search Report as issued in International Patent Application No. PCT/EP2018/068606, dated Sep. 17, 2018.

*Primary Examiner* — Nathanael R Briggs
(74) *Attorney, Agent, or Firm* — Pillsbury Winthrop Shaw Pittman LLP (57) ABSTRACT

A device having a functional element having electrically controllable optical properties, includes an electrical energy source having an output voltage U, a functional element having electrically controllable optical properties, and at least two supply lines, by means of which the electrical energy source and the functional element are connected. The output voltage U has an alternating voltage having a frequency f from 40 Hz to 210 Hz, a maximum amplitude $U_{max}$ from 24 V to 100 V, and a slope in the range of the output voltage U between −80% $U_{max}$ and 80% $U_{max}$ from (Continued)

$0.05 * U_{max}/100$ µs to $0.1 * U_{max}/100$ µs and in the range of the output voltage U between 80% $U_{max}$ and −80% $U_{max}$ from −$0.05 * U_{max}/100$ µs to −$0.1 * U_{max}/100$ µs.

18 Claims, 4 Drawing Sheets

(51) Int. Cl.
  *G02F 1/1685* (2019.01)
  *B60J 3/04* (2006.01)
  *E06B 9/24* (2006.01)
  *G02F 1/1334* (2006.01)

(52) U.S. Cl.
  CPC ............ *G02F 1/166* (2019.01); *G02F 1/1685* (2019.01); *E06B 2009/247* (2013.01); *E06B 2009/2417* (2013.01)

(56) References Cited

FOREIGN PATENT DOCUMENTS

| | | |
|---|---|---|
| DE | 10 2005 049081 B3 | 6/2007 |
| DE | 10 2007 027296 A1 | 12/2008 |
| DE | 10 2013 001334 A1 | 7/2014 |
| JP | 2013-072895 A | 4/2013 |

* cited by examiner

DEVICE FOR OPERATING FUNCTIONAL ELEMENTS HAVING ELECTRICALLY CONTROLLABLE OPTICAL PROPERTIES

CROSS-REFERENCE TO RELATED APPLICATIONS

This application is the U.S. National Stage of PCT/EP2018/068606, filed Jul. 10, 2018, which in turn claims priority to European patent application number 17 180 842.1 filed Jul. 12, 2017. The content of these applications are incorporated herein by reference in their entireties.

The invention relates to a device for operating at least one functional element having electrically controllable optical properties.

In the vehicle sector and in the construction sector, composite panes with electrically controllable functional elements are often used as sun screens or as privacy screens.

Thus, for example, windshields are known in which a sun visor is integrated in the form of a functional element having electrically controllable optical properties. In particular, the transmittance or scattering properties of electromagnetic radiation in the visible range are electrically controllable. The functional elements are usually filmlike and are laminated into or glued onto a composite pane. In the case of windshields, the driver can control the transmittance behavior of the pane itself relative to sunlight. Thus, a conventional mechanical sun visor can be dispensed with. As a result, the weight of the vehicle can be reduced and space gained in the roof region. In addition, the electrical control of the sun visor is more convenient than the manual folding down of the mechanical sun visor.

Windshields with such electrically controllable sun visors are, for example, known from DE 102013001334 A1, DE 102005049081 B3, DE 102005007427 A1, and DE 102007027296 A1.

Typical electrically controllable functional elements contain electrochromic layer structures or single particle device (SPD) films. Further possible functional elements for realizing an electrically controllable sun screen are so-called PDLC functional elements (polymer dispersed liquid crystal). Their active layer contains liquid crystals that are embedded in a polymer matrix. Transparent surface electrodes are arranged on both sides of the active layer such that an electrical field can be applied in the active layer. When no voltage is applied, the liquid crystals are randomly oriented, resulting in strong scattering of the light passing through the active layer. When a voltage is applied on the surface electrodes, the liquid crystals align themselves in a common direction and the transmittance of light through the active layer is increased. The PDLC functional element acts less by reducing total transmittance, but, instead, by increasing scattering to ensure protection against glare. By way of example, US 2017/090224 A1 and JP 2013 072895 A describe such PDLC functional elements.

The object of the present invention is, consequently, to provide an improved device for operating functional elements having electrically controllable optical properties that is improved, in particular with regard to its aging resistance.

The object of the present invention is accomplished by a device in accordance with the independent claim 1. Preferred embodiments emerge from the dependent claims.

A device according to the invention for operating functional elements having electrically controllable optical properties, comprises at least:

an electrical energy source having an output voltage U,
at least one functional element having electrically controllable optical properties and
at least two supply lines, by means of which the electrical energy source and the functional element are connected,
wherein the output voltage U has an alternating voltage having
a frequency f of 40 Hz to 210 Hz, preferably from 45 Hz to 105 Hz, and particularly preferably from 49 Hz to 69 Hz,
a maximum amplitude $U_{max}$ from 24 V to 100 V, preferably from 50 V to 75 V, and particularly preferably from 60 V to 70 V
and a slope in the range of the output voltage U between $-80\% \ U_{max}$ and $80\% \ U_{max}$ from $0.05*U_{max}/100$ μs to $0.1*U_{max}/100$ μs and in the range of the output voltage U between $80\% \ U_{max}$ and $-80\% \ U_{max}$ from $-0.05*U_{max}/100$ μs to $-0.1*U_{max}/100$ μs.

This means that the device according to the invention includes at least one functional element according to the invention and further devices for its operation.

The term "slope" means, as mathematically common, the derivation of the output voltage U over time (dU(t)/dt), in other words, the local slope at any point in time within the respective output voltage range U indicated (i.e., between $-80\% \ U_{max}$ and $80\% \ U_{max}$ (rising edge) or between $80\% \ U_{max}$ and $-80\% \ U_{max}$ (falling edge)). The slope is not necessarily constant within the respective rising or falling edge. It is merely important that in the respective range, the slope not leave the slope range according to the invention.

In a preferred embodiment of the invention, the output voltage U can progress linearly with the time t, even in the respective range of an rising or falling edge, such that the slope is constant in the respective range.

The maximum amplitude $U_{max}$ is preferably constant or is constant over a certain temperature range or below a certain threshold temperature.

In another advantageous embodiment according to the invention, the slope in the range of the output voltage U is
between $-100\% \ U_{max}$ to $-80\% \ U_{max}$ and between $80\% \ U_{max}$ to $100\% \ U_{max}$ less than $0.05*U_{max}/100$ μs (preferably between 0 and $0.05*U_{max}/100$ μs) and
between $100\% \ U_{max}$ to $80\% \ U_{max}$ and between $-80\% \ U_{max}$ to $-100\% \ U_{max}$ greater than $-0.05*U_{max}/100$ μs (preferably between $-0.05*U_{max}/100$ μs and 0).

In an advantageous embodiment according to the invention, the slope in the range of the output voltage U is
between $-90\% \ U_{max}$ to $90\% \ U_{max}$ from $0.05*U_{max}/100$ μs to $0.1*U_{max}/100$ μs and
between $90\% \ U_{max}$ to $-90\% \ U_{max}$ from $-0.05*U_{max}/100$ μs to $-0.1*U_{max}/100$ μs.

In an advantageous further development, the slope in the range of the output voltage U is
between $-100\% \ U_{max}$ to $-90\% \ U_{max}$ and between $90\% \ U_{max}$ to $100\% \ U_{max}$ less than $0.05*U_{max}/100$ μs and
between $100\% \ U_{max}$ to $90\% \ U_{max}$ and between $-90\% \ U_{max}$ to $-100\% \ U_{max}$ greater than $-0.05*U_{max}/100$ μs.

A functional element according to the invention is advantageously arranged on an outside or an inside of a single-pane or a composite pane, or inside a composite pane.

In an advantageous further development, the device according to the invention has a thermometer that is arranged on the functional element. The maximum distance between the thermometer and the functional element is preferably 10 mm and particularly preferably 1 mm. The thermometer is in particular arranged directly on the functional element.

The thermometer is, for example, a resistance thermometer or, generally, a thermistor with a negative temperature coefficient (NTC) or a positive temperature coefficient (PTC), preferably in miniature design.

The thermometer is coupled to the energy source, for example, via signal lines. The energy source is designed such that the temperature can be measured at the thermometer and the maximum output voltage $U_{max}$ is adapted to the temperature.

The invention further comprises a method for controlling the device according to the invention, wherein
a) a temperature T is measured at the thermometer, and
b) the maximum amplitude $U_{max}$ of the output voltage U is adapted to the temperature, wherein from a certain threshold temperature $T_S$ as the temperature T increases the maximum amplitude $U_{max}$ is lowered and all the way to the threshold temperature $T_S$ as the temperature T drops, the maximum amplitude $U_{max}$ is increased.

For temperatures T below the threshold temperature $T_S$, the maximum amplitude $U_{max}$ is preferably kept constant.

The invention further includes a method for operating a device according to the invention, wherein the temperature T is measured at the thermometer and the maximum amplitude $U_{max}$ of the output voltage U is adapted as a function of the temperature T, wherein for $T \leq T_S$: $U_{max,u} \leq U_{max} \leq U_{max,o}$ and
for $T > T_S$: $U_{max,u} + g_u*(T-T_S) \leq U_{max,T} \leq U_{max,o} + g_o*(T-T_S)$
with $U_{max,u} \leq U_{max,T} \leq U_{max,o}$ and $g_u \leq g_o \leq 0$ V/° C.
and $T_S$ is constant.

$U_{max,u}$ is a lower maximum amplitude, $U_{max,o}$ is an upper maximum amplitude; $g_u$ is a lower slope; $g_o$ is an upper slope.

In a preferred embodiment,
$U_{max,u}$=24 V, $U_{max,o}$=100 V, $g_u$=2 V/° C., and $g_o$=0.3 V/° C. and 40° C.$\leq T_S \leq$60° C.

In a particularly preferred embodiment,
$U_{max,u}$=60 V, $U_{max,o}$=70 V, $g_u$=1.5 V/° C., and $g_o$=0.5 V/° C. and 40° C.$\leq T_S \leq$60° C.

In another preferred embodiment of the method according to the invention:
for $T \leq T_S$: $U_{max}=U_{max,k}$=constant at 50 V$\leq U_{max,k} \leq$75 V and
for $T > T_S$: $U_{max}=U_{max,k}$+g $(T-T_S)$ with −1.5 V/° C.$\leq g \leq$−0.5 V/° C.
and $T_S$=constant at 40° C.$\leq T_S \leq$60° C.,
particularly preferably 45° C.$\leq T_S \leq$55° C. and, for example, $T_S$=50° C.

In another preferred embodiment of the method according to the invention:
for $T \leq T_S$: $U_{max}=U_{max,k}$=constant at 60 V$\leq U_{max,k} \leq$70 V and
for $T > T_S$: $U_{max}=U_{max,k}$+g $(T-T_S)$ with
g=constant and −1.5 V/° C.$\leq g \leq$−0.5 V/° C. and
$T_S$=constant at 40° C.$\leq T_S \leq$60° C.,
particularly preferably 45° C.$\leq T_S \leq$55° C. and, for example, $T_S$=50° C.

A composite pane according to the invention comprises at least:
a stack sequence formed by an outer pane, a first intermediate layer, a second intermediate layer, and an inner pane, wherein the intermediate layers include, in each case, at least one thermoplastic polymer film with at least one plasticizer, and
a functional element having electrically controllable optical properties is arranged between the first intermediate layer and the second intermediate layer at least in sections.

The composite pane can, for example, be the windshield or the roof panel of a vehicle or another vehicle glazing, for example, a separating pane in a vehicle, preferably in a rail vehicle or a bus. Alternatively, the composite pane can be an architectural glazing, for example, in an external façade of a building or a separating pane in the interior of a building.

The terms "outer pane" and "inner pane" arbitrarily describe two different panes. In particular, the outer pane can be referred to as "a first pane" and the inner pane as "a second pane".

When the composite pane is provided, in a window opening of a vehicle or of a building, to separate an interior from the external environment, "inner pane" refers, in the context of the invention, to the pane (second pane) facing the interior (vehicle interior). "Outer pane" refers to the pane (first pane) facing the external environment. The invention is, however, not restricted to this.

The composite pane according to the invention includes a functional element having electrically controllable optical properties that is arranged, at least in sections, between a first intermediate layer and a second intermediate layer. The first and second intermediate layer customarily have the same dimensions as the outer pane and the inner pane.

The functional element is preferably implemented flat or, in other words, filmlike.

In an advantageous embodiment of a composite pane according to the invention, the intermediate layer contains a polymer, preferably a thermoplastic polymer.

In a particularly advantageous embodiment of a composite pane according to the invention, the intermediate layer contains at least 3 wt.-%, preferably at least 5 wt.-%, particularly preferably at least 20 wt.-%, even more preferably at least 30 wt.-%, and in particular at least 40 wt.-% of a plasticizer. Preferably, the plasticizer contains or consists of triethylene glycol-bis-(2-ethyl hexanoate).

Plasticizers are chemicals that make plastics softer, more flexible, smoother, and/or more elastic. They shift the thermoelastic range of plastics to lower temperatures such that the plastics have the desired more elastic properties in the range of the temperature of use. Other preferred plasticizers are carboxylic acid esters, in particular low-volatility carboxylic acid esters, fats, oils, soft resins, and camphor. Other plasticizers are preferably aliphatic diesters of tri- or tetraethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula $C_4H_9CH$ $(CH_2CH_3)$ CO $(OCH_2CH_2)_3O_2CCH$ $(CH_2CH_3)$ $C_4H_9$.

In another particularly advantageous embodiment of a composite pane according to the invention, the intermediate layer contains at least 60 wt.-%, preferably at least 70 wt.-%, particularly preferably at least 90 wt.-%, and in particular at least 97 wt.-% polyvinyl butyral.

The thickness of each intermediate layer is preferably from 0.2 mm to 2 mm, particularly preferably from 0.3 mm to 1 mm, in particular from 0.3 mm to 0.5 mm, for example, 0.38 mm.

In an advantageous embodiment of a composite pane according to the invention, the functional element is directly surrounded completely or in sections by a barrier film. The barrier film is implemented such that the diffusion of plasticizers out of the intermediate layer through the barrier film into the active layer of the functional element, which destroys their electrically controllable optical properties, is prevented In a particularly advantageous embodiment of a composite pane according to the invention, the barrier film is low in plasticizers, preferably with a plasticizer content of less than 3 wt.-%, particularly preferably of less than 1 wt.-%, and in particular of less than 0.5 wt.-%. Most particularly preferably, the barrier film is plasticizer-free, in other words, without deliberate addition of a plasticizer. The barrier film contains or is made of a polymer, preferably polyethylene terephthalate (PET) or polyvinyl fluoride (PVF). The barrier film can also contain low-plasticizer polyvinyl butyral (PVB) with a plasticizer content of less than 3 wt.-%.

The controllable functional element typically comprises an active layer between two surface electrodes. The active layer has the controllable optical properties that can be controlled via the voltage applied to the surface electrodes. The surface electrodes and the active layer are typically arranged substantially parallel to the surfaces of the outer pane and the inner pane. The surface electrodes are electrically connected to an external voltage source in a manner known per se. The electrical contacting is realized by means of suitable connecting cables, for example, foil conductors that are optionally connected to the surface electrodes via so-called "busbars", for example, strips of an electrically conductive material or electrically conductive imprints.

The surface electrodes are preferably designed as transparent, electrically conductive layers. The surface electrodes preferably contain at least a metal, a metal alloy, or a transparent conductive oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness of 10 nm to 2 µm, particularly preferably from 20 nm to 1 µm, most particularly preferably from 30 nm to 500 nm.

The functional element can have, besides the active layer and the surface electrodes, other layers known per se, for example, barrier layers, blocking layers, antireflection layers, protective layers, and/or smoothing layers.

The functional element is preferably present as a multilayer film with two outer carrier films. In such a multilayer film, the surface electrodes and the active layer are arranged between the two carrier films. Here, "outer carrier film" means that the carrier films form the two surfaces of the multilayer film. The functional element can thus be provided as a laminated film that can be processed advantageously. The functional element is advantageously protected by the carrier films against damage, in particular corrosion. The multilayer film contains, in the order indicated, at least one carrier film, one surface electrode, one active layer, another surface electrode, and another carrier film. The carrier film carries, in particular, the surface electrodes and gives a liquid or soft active layer the necessary mechanical stability.

The carrier films preferably contain at least one thermoplastic polymer, particularly preferably low-plasticizer or plasticizer-free polyethylene terephthalate (PET). This is particularly advantageous in terms of the stability of the multilayer film. The carrier films can, however, also contain or be made of other low-plasticizer or plasticizer-free polymers, for example, ethylene vinyl acetate (EVA), polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene-tetrafluoroethylene. The thickness of each carrier film is preferably from 0.1 mm to 1 mm, particularly preferably from 0.1 mm to 0.2 mm.

Typically, the carrier films have in each case an electrically conductive coating that faces the active layer and acts as a surface electrode.

In another advantageous embodiment of a composite pane according to the invention, the functional element is a PDLC functional element (polymer dispersed liquid crystal). The active layer of a PDLC functional element contains liquid crystals that are embedded in a polymer matrix. When no voltage is applied on the surface electrodes, the liquid crystals are randomly oriented, resulting in strong scattering of the light passing through the active layer. When a voltage is applied on the surface electrodes, the liquid crystals align themselves in a common direction and the transmittance of light through the active layer is increased.

In principle, however, it is also possible to use other types of controllable functional elements, for example, electrochromic functional elements or SPD functional elements (suspended particle device). The controllable functional elements mentioned and their mode of operation are known per se to the person skilled in the art such that a detailed description can be dispensed here.

Functional element as multilayer films are commercially available. The functional element to be integrated is typically cut out of a multilayer film of relatively large dimensions in the desired shape and size. This can be done mechanically, for example, with a knife. In an advantageous embodiment, the cutting is done using a laser. It has been demonstrated that, in this case, the side edge is more stable than with mechanical cutting. With mechanically cut side edges, there can be a risk that the material pulls back, which is visually conspicuous and adversely affects the aesthetics of the pane. Additionally, the risk that the surface electrodes touch one another is increased.

The functional element is joined to the outer pane via a region of the first intermediate layer and to the inner pane via a region of the second intermediate layer. The intermediate layers are preferably arranged areally one atop another and laminated to one another, with the functional element inserted between the two layers. The regions of the intermediate layers overlapping the functional element then form the regions that join the functional element to the panes. In other regions of the pane where the intermediate layers are in direct contact with one another, they can fuse during lamination such that the two original layers are possibly no longer discernible and there is, instead, one homogeneous intermediate layer.

An intermediate layer can, for example, be formed by a single thermoplastic film. An intermediate layer can also be formed as a two-ply, three-ply, or multi-ply film stack, wherein the individual films have the same or different properties. An intermediate layer can also be formed from sections of different thermoplastic films whose side edges abut.

In an advantageous development of a composite pane according to the invention, the region of the first or the second intermediate layer via which the functional element is joined to the outer pane or to the inner pane is tinted or colored. The transmittance of this region in the visible spectral range is thus reduced compared to a non-tinted or non-colored layer. The tinted/colored region of the intermediate layer thus reduces the transmittance of the windshield in the region of the sun visor. In particular, the aesthetic impression of the functional element is improved because the tinting results in a more neutral appearance, which has a more pleasant effect on the viewer.

In the context of the invention, "electrically controllable optical properties" means properties that are infinitely controllable but also those that can be switched between two or more discrete states.

The electrical control of the sun visor is done, for example, using switches, rotary knobs, or sliders that are integrated into the dashboard of the vehicle. However, a switch area for controlling the sun visor can also be integrated into the windshield, for example, a capacitive switch area. Alternatively, or additionally, the sun visor can be controlled by contactless methods, for example, by gesture recognition, or as a function of the pupil or eyelid state detected by a camera and suitable evaluation electronics. Alternatively, or additionally, the sun visor can be controlled by sensors that detect light incidence on the pane.

The tinted or colored region of the intermediate layer preferably has transmittance in the visible spectral range from 10% to 50%, particularly preferably from 20% to 40%. With that, particularly good results are achieved in terms of glare protection and visual appearance.

The intermediate layer can be formed by a single thermoplastic film, wherein the tinted or colored region is produced by local tinting or coloring. Such films can be obtained, for example, by coextrusion. Alternatively, a non-tinted film section and a tinted or colored film section can be combined to form the thermoplastic layer.

The tinted or colored region can be homogeneously colored or tinted, in other words, can have location-independent transmittance. The tinting or coloring can, however, also be inhomogeneous, in particular a transmittance progression can be realized. In one embodiment, the transmittance level decreases in the tinted or colored region, at least in sections, with increasing distance from the upper edge. Thus, sharp edges of the tinted or colored area can be avoided such that the transition from the sun visor into the transparent region of the windshield is gradual, thus appearing aesthetically more attractive.

In an advantageous embodiment, the region of the first intermediate layer, i.e., the region between the functional element and the outer pane is tinted. This gives a particularly aesthetic impression when the outer pane is viewed from above. The region of the second intermediate layer between the functional element and the inner pane can, optionally, be additionally colored or tinted.

The composite pane having an electrically controllable functional element can advantageously be implemented as a windshield with an electrically controllable sun visor.

Such a windshield has an upper edge and a lower edge as well as two side edges extending between the upper edge and the lower edge. "Upper edge" refers to that edge that is intended to point upward in the installation position. "Lower edge" refers to that edge that is intended to point downward in the installation position. The upper edge is often also referred to as the "roof edge"; the lower edge, as the "engine edge".

Windshields have a central field of vision, the optical quality of which is subject to high requirements. The central field of vision must have high light transmittance (typically greater than 70%). Said central field of vision is, in particular, that field of vision that is referred to by the person skilled in the art as field of vision B, vision area B, or zone B. The field of vision B and its technical requirements are specified in Regulation No. 43 of the Economic Commission for Europe of the United Nations (UN/ECE) (ECE-R43, "Uniform Provisions concerning the Approval of Safety Glazing Materials and Their Installation on Vehicles"). There, the field of vision B is defined in Annex 18.

The functional element is then advantageously arranged above the central field of vision (field of vision B). This means that the functional element is arranged in the region between the central field of vision and the upper edge of the windshield. The functional element does not have to cover the entire area, but is positioned completely within this area, and does not protrude into the central field of vision. In other words, the functional element is less distant from the upper edge of the windshield than the central field of vision. Thus, the transmittance of the central field of vision is not affected by the functional element, which is positioned in a location similar to that of a conventional mechanical sun visor in the folded-down state.

The windshield is preferably provided for a motor vehicle, particularly preferably for a passenger car.

In a preferred embodiment, the functional element, more precisely the side edges of the functional element are circumferentially surrounded by a third intermediate layer. The third intermediate layer is designed like a frame with a recess into which the functional element is inserted. The third intermediate layer can also be formed by a thermoplastic film into which the recess is introduced by cutting. Alternatively, the third intermediate layer can also be composed of a plurality of film sections around the functional element. The intermediate layer is preferably formed from a total of at least three thermoplastic layers arranged areally atop one another, wherein the middle layer has a recess in which the functional element is arranged. During production, the third intermediate layer is arranged between the first and the second intermediate layer, with the side edges of all intermediate layers preferably arranged congruently. The third intermediate layer preferably has approx. the same thickness as the functional element. Thus, the local difference in thickness of the windshield, which is introduced by the locally limited functional element, is compensated such that glass breakage during lamination can be avoided.

The side edges of the functional element visible when looking through the windshield are preferably arranged flush with the third intermediate layer such that no gap exists between the side edge of the functional element and the associated side edge of the intermediate layer. This is in particular true for the lower edge of the functional element, which is typically visible. Thus, the boundary between the third intermediate layer and the functional element is visually less noticeable. In addition, the edges can be concealed by a black print, for example, on the outer side of the pane.

In a preferred embodiment, the lower edges of the functional element and of the tinted region of the intermediate layer(s) are adapted to the shape of the upper edge of the windshield, yielding a more appealing visual impression. Since the upper edge of a windshield is typically curved, in particular concavely curved, the lower edge of the functional element and of the tinted region is also preferably curved. Particularly preferably, the lower edges of the functional element are substantially parallel to the upper edge of the windshield. It is, however, also possible to construct the sun visor from two halves, each straight, arranged at an angle relative to one another, and, in a V shape, approximating the shape of the upper edge.

In one embodiment of the invention, the functional element is divided into segments by isolation lines. The isolation lines can in particular be introduced into the surface electrodes such that the segments of the surface electrode are isolated from one another. The individual segments are connected to the voltage source independently of one another such that they can be actuated separately. Thus, different regions of the sun visor can be switched independently. Particularly preferably, the isolation lines and the segments are arranged horizontally in the installation position. Thus, the height of the sun visor can be controlled by the user. The term "horizontal" is to be interpreted broadly here and refers to a direction of extension that, in a windshield, extends between the side edges of the windshield. The isolation lines do not necessarily have to be straight, but can also be slightly curved, preferably adapted to possible curvature of the upper edge of the windshield, in particular substantially parallel to the upper edge of the windshield. Vertical isolation lines are, of course, also possible.

The isolation lines have, for example, a width of 5 μm to 500 μm, in particular 20 μm to 200 μm. The width of the segments, i.e., the distance between adjacent isolation lines can be suitably selected by the person skilled in the art according to the requirements of the individual case.

The isolation lines can be introduced by laser ablation, mechanical cutting, or etching during production of the functional element. Already laminated multilayer films can also be subsequently segmented by laser ablation.

The upper edge and the side edges or all side edges of the functional element are concealed in vision through the composite pane, preferably by an opaque masking print or by an outer frame. Windshields typically have a circumferential peripheral masking print made of an opaque enamel, which serves in particular to visually conceal the adhesive used for installation of the window and to protect it against UV radiation. This peripheral masking print is preferably used to also conceal the upper edge and the side edge of the functional element as well as the necessary electrical connections. The sun visor is then advantageously integrated into the appearance of the windshield and only the lower edge is potentially discernible to the observer. Preferably, both the outer pane and also the inner pane have a masking print such that through-vision is prevented from both sides.

The functional element can also have recesses or holes, for instance, in the region of so-called "sensor windows" or "camera windows". These regions are provided to be equipped with sensors or cameras whose function would be impaired by a controllable functional element in the beam path, for example, rain sensors. It is also possible to implement the sun visor with at least two functional elements separated from one another, with a distance between the functional elements providing space for a sensor window or a camera window.

The functional element (or the totality of the functional elements in the above-described case of a plurality of functional elements) is preferably arranged over the entire width of the composite pane or of the windshield, minus an edge region on both sides having a width of, for example, 2 mm to 20 mm. The functional element also preferably has a distance of, for example, 2 mm to 20 mm from the upper edge. The functional element is thus encapsulated within the intermediate layer and protected against contact with the surrounding atmosphere and corrosion.

The outer pane and the inner pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored. Windshields must have adequate light transmittance in the central field of vision, preferably at least 70% in the primary through-vision zone A per ECE-R43.

The outer pane, the inner pane, and/or the intermediate layer can have further suitable coatings known per se, for example, antireflection coatings, nonstick coatings, antiscratch coatings, photocatalytic coatings, or solar protection coatings, or low-E coatings.

The thickness of the outer pane and the inner pane can vary widely and thus be adapted to the requirements of the individual case. The outer pane and the inner pane preferably have thicknesses of 0.5 mm to 5 mm, particularly preferably of 1 mm to 3 mm.

The invention is based on the realization by the inventors that it is advantageous for the voltage on the functional element to reach its maximum or minimum as quickly as possible. Due to the customarily large capacitance of the functional element, large switching currents, which greatly heat the supply line, the contact, and the surface electrodes, are necessary and result in rapid aging of the functional element. Particularly critical here are locations with relatively high contact resistance, for example, at the transition from the supply lines to the busbar that contacts the surface electrodes or at the transition between the busbar and the surface electrode. There, locally higher temperatures that damage the surface electrodes or the active layer of the functional element or cause premature aging can occur. As a result of the reduced slope according to the invention, such local overheating can be avoided.

As already mentioned, it is advantageous for optical transparency for the maximum or minimum voltage on the functional element to be reached as quickly as possible. In the case of a rectangular or trapezoidal signal, the rapid transition between edge and plateau can result in problems in electromagnetic compatibility (EMC) on adjacent electronics. A rounding of the transition improves the electromagnetic compatibility by reducing interference signals.

The invention further includes the use of a device for operating functional elements according to the invention having electrically controllable optical properties in an interior glazing or an exterior glazing in a vehicle or a building, wherein the electrically controllable functional element is used as a sun screen or as a privacy screen.

The invention further includes the use of a device for operating functional elements according to the invention having electrically controllable optical properties in a windshield or roof panel of a vehicle, wherein the electrically controllable functional element is used as a sun visor.

A major advantage of the invention, with composite panes as a windshield, consists in that a conventional vehicle-roof-mounted, mechanically foldable sun visor can be dispensed with. Consequently, the invention also includes a vehicle, preferably a motor vehicle, in particular a passenger car, that has no such conventional sun visor.

The invention also includes the use of a tinted or colored region of an intermediate layer for joining a functional element having electrically controllable optical properties with an outer pane or an inner pane of a windshield, wherein an electrically controllable sun visor is realized by means of the tinted or colored region of the intermediate layer and the functional element.

The invention is explained in detail with reference to drawings and exemplary embodiments. The drawings are schematic representations and not true to scale. The drawings in no way restrict the invention. They depict.

Figure 1A:
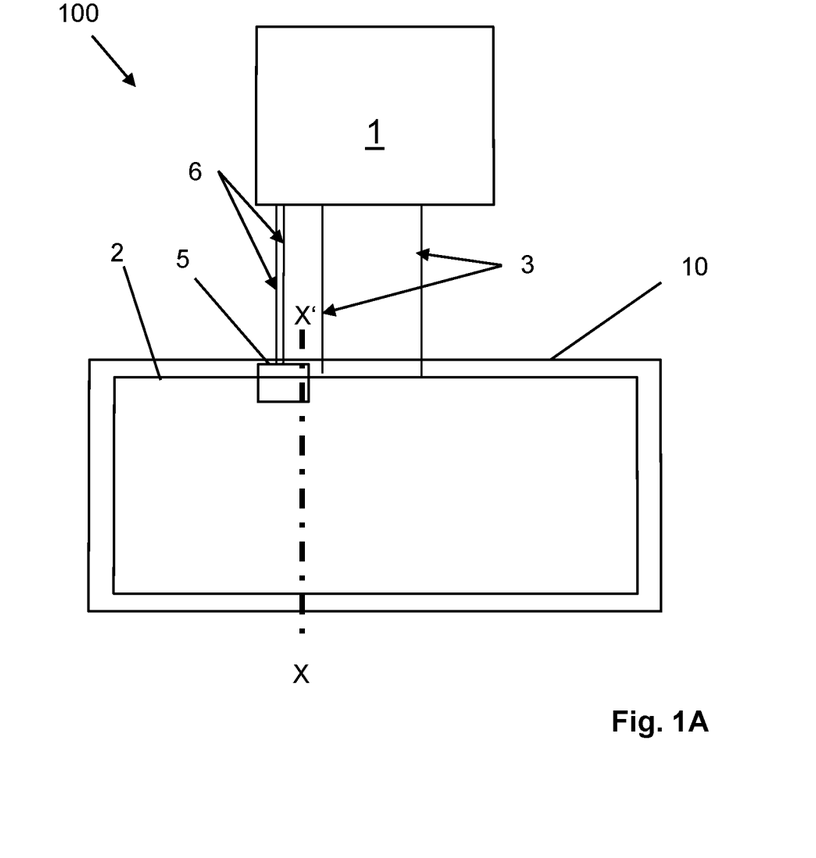
FIG. 1A a plan view of an embodiment of a device according to the invention for operating functional elements having electrically controllable optical properties, FIG. 1B a cross-section through the composite pane of FIG. 1A along the section line X-X', FIG. 1C an enlarged representation of the region Z of FIG. 1B, FIG. 2A a diagram of the output voltage U as a function of the time t, FIG. 2B an enlarged detail of output voltage U as a function of the time t from the diagram of FIG. 2A.

FIG. 1A depicts a device 100 for operating a functional element 2 having electrically controllable optical properties. The device 100 includes an electrical energy source 1, which is electrically conductively connected to a functional element 2 via two supply lines 3. The functional element 2 is arranged here, for example, inside a composite pane 10.

Figure 1B:
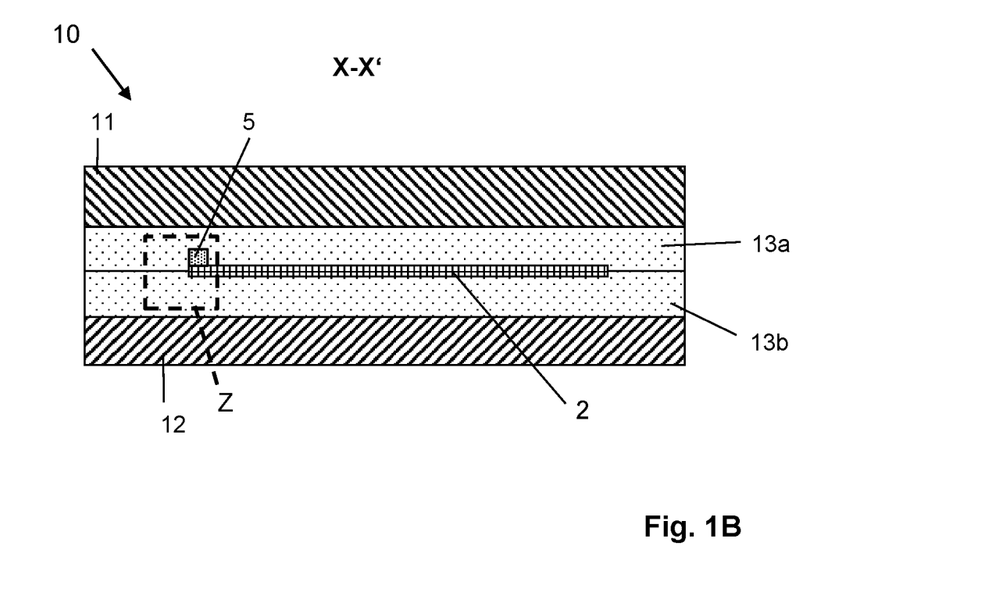

FIG. 1B depicts a cross-section through a composite pane 10 according to the invention. The composite pane 10 comprises an outer pane 11 and an inner pane 12 that are joined to one another via a first intermediate layer 13a and a second intermediate layer 13b. The outer pane 11 has a thickness of 2.1 mm and is made, for example, of clear soda lime glass. The inner pane 12 has a thickness of 1.6 mm and is also made, for example, of clear soda lime glass. The composite pane 10 can be arranged, for example, as vehicle glazing as a roof panel in the roof of the motor vehicle. In another exemplary embodiment, the composite pane 10 can be arranged as architectural glazing in the frame of a window with other panes to form an insulating glazing.

A functional element 2 that is controllable in its optical properties via an electrical voltage is arranged between the first intermediate layer 3a and the second intermediate layer 3b.

Figure 1C:
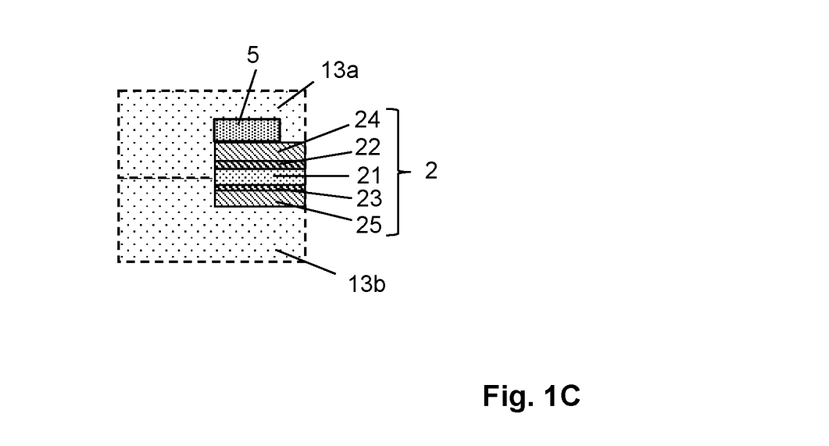

The controllable functional element 2 is, for example, a PDLC multilayer film consisting of an active layer 21 between two surface electrodes 22, 23 and two carrier films 24, 25. The active layer 21 contains a polymer matrix with liquid crystals dispersed therein that are oriented as a function of the electrical voltage applied on the surface electrodes, by which means the optical properties can be controlled. The carrier films 24, 25 are made of PET and have a thickness of, for example, 0.125 mm. The carrier films 24, 25 are provided with a coating of ITO facing the active layer 21 and having a thickness of approx. 100 nm that form the surface electrodes 22, 23. The surface electrodes 22, 23 are electrically connected to the supply lines 3 via busbars (not shown) (formed, for example, by a silver-containing screen print) and, via them, to the energy source 1.

The intermediate layers 13a, 13b comprise in each case a thermoplastic film with a thickness of 0.38 mm. The intermediate layers 13a, 13b are made, for example, of 78 wt.-% polyvinyl butyral (PVB) and 20 wt.-% triethylene glycol bis(2-ethyl hexanoate) as plasticizer.

The electrical energy source 1 outputs an output voltage U that is applied via the supply lines 3 on the surface electrodes 22, 23 of the surface element 2 and that controls, by the voltage level, the optical properties of the surface element 2, i.e., in this case the transparency to visible-light.

Figure 2A:
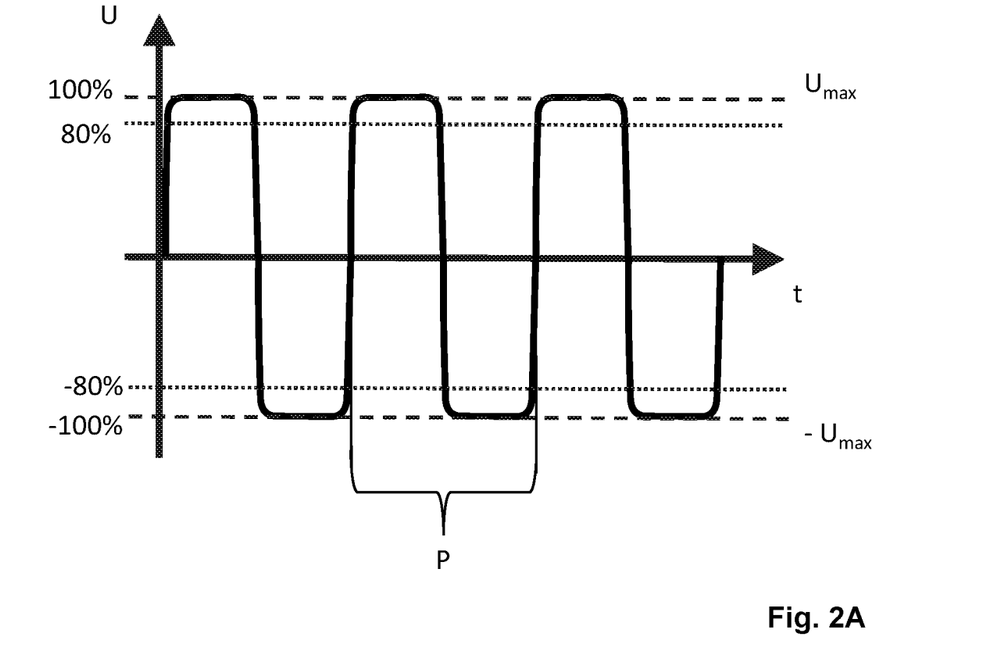

FIG. 2A shows a diagram of the output voltage U of the energy source 1 as a function of the time t. The output voltage U is outputted by the energy source 1 during operation of the device, i.e., when the functional element is connected.

Figure 2B:
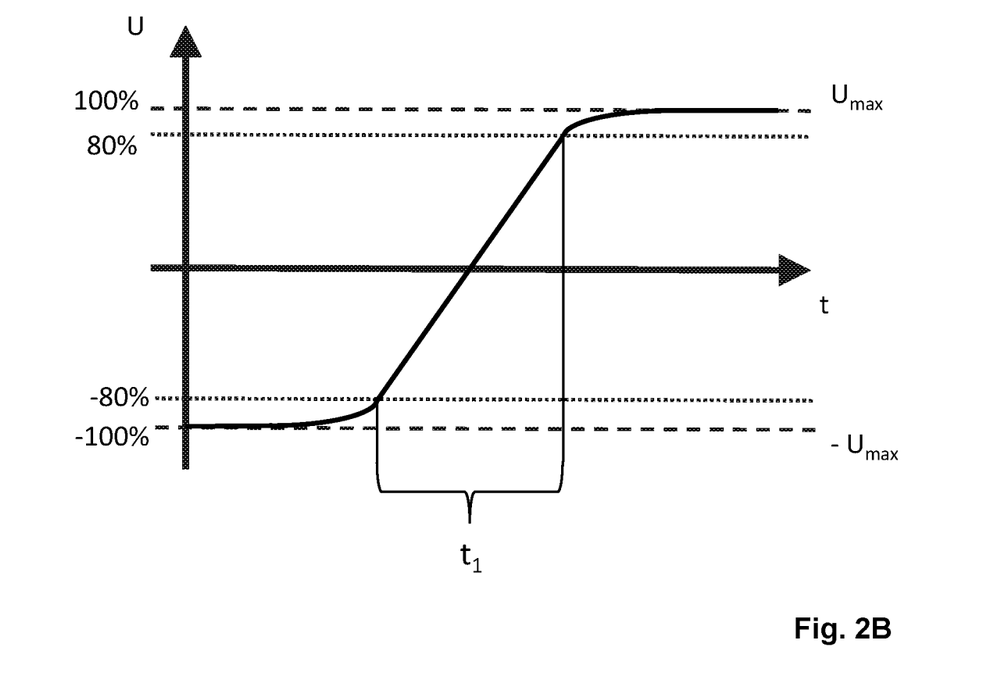

FIG. 2B shows an enlarged detail of the diagram of FIG. 2A. The output voltage U is essentially a trapezoidal voltage with slightly oblique edges and rounded corners. The output voltage U changes between a minimum value of $-U_{max}$ (negative maximum output voltage) and a maximum value of $U_{max}$ (positive maximum output voltage) and, for example, between −65 V and +65 V.

The frequency is, for example, 50 Hz such that the period duration P=20 ms.

The slope of the rising edge between −80% $U_{max}$ and +80% $U_{max}$, i.e., between −52 V and +52 V is 0.075*$U_{max}$/100 μs, i.e., 4.875 V/100 μs. The rise time $t_1$, i.e., the temporal length of the rising edge von −52 V to +52 V, is, consequently, 1066.6 μs. The slope of the rising edge between 80% $U_{max}$ and −80% $U_{max}$, i.e., between +52 V and −52 V is, for example, −0.075*$U_{max}$/100 μs, i.e., −4.875 V/100 μs. The temporal length of the rising edge from +52 V to −52 V is, consequently, likewise 1066.6 μs.

The slope decreases for values between 80% $U_{max}$ and 100% $U_{max}$ and is significantly less than 0.075*$U_{max}$/100 μs. This applies correspondingly to the range between 100% $U_{max}$ to 80% $U_{max}$, −80% $U_{max}$ to −100% $U_{max}$, and −100% $U_{max}$ to −80% $U_{max}$. The rounding of the corners of the rectangular signal improves the electromagnetic compatibility (EMC) of the device 100 and significantly reduces interference, for example, in electronics in the surroundings.

The reduced slope in the range between −80% $U_{max}$ and +80% $U_{max}$ as well as between 80% $U_{max}$ and −80% $U_{max}$ reduces the charge/discharge currents of the layer system and thus reduces heating of the supply lines and of the active layer. Thus, significant aging resistance can be achieved.

Figure 3:
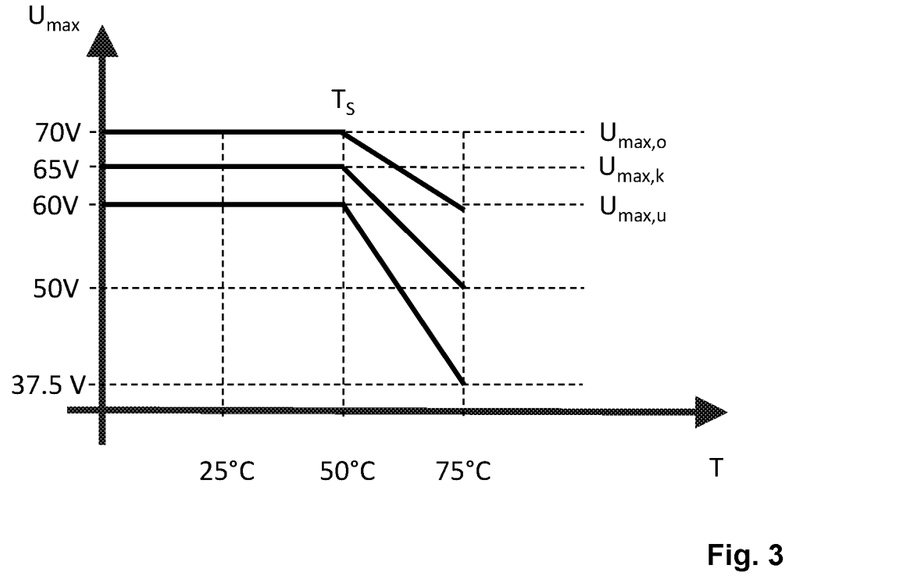
FIG. 3 depicts a diagram of the maximum output voltage $U_{max}$ as a function of the temperature T.

FIG. 3 shows a diagram of the temperature-dependent maximum amplitude $U_{max}$ of the output voltage U as a function of the temperature T.

According to one embodiment of the method according to the invention, the maximum output voltage $U_{max}$ of the output voltage U is adapted to the temperature T of the functional element 2. The temperature T is measured by a thermometer 5 that is arranged here, for example, directly on the functional element 2 (see, for example, FIGS. 1A, 1B, and 1C).

In the example presented here, below a threshold voltage $T_S$, the maximum amplitude $U_{max}$ of the output voltage U is constant (=$U_{max,k}$). Above a threshold temperature $T_S$ of, for example, 50° C., the maximum amplitude $U_{max}$ is lowered. The maximum amplitude $U_{max}$ is, for temperatures T that are greater than the threshold temperature $T_S$, for example, $U_{max}$−1.0 V/° C.*(T−$T_S$). In other words, with a maximum output voltage $U_{max}$ (in the temperature range ≤$T_S$) of 65 V and a temperature T of 75° C., the temperature-dependent maximum output voltage $U_{max}$ is, for example, 65 V−1.0° C.*(75° C.−50° C.)=40 V.

As investigations by the inventors showed, such a temperature-dependent maximum output voltage $U_{max}$ suffices for achieving the desired switching result in terms of the ultimate optical properties, i.e., for achieving comparable transparency values and opacity values as with higher maximum output voltages in the lower temperature range. At the same time, energy for operation is saved and unnecessary additional heating of the functional element is reduced, thus increasing its service life.

Without intending to subscribe to a theory, this behavior can be understood in a simple model: PDLC films contain a polymer liquid crystal film that is embedded between two transparent films. Randomly oriented electrically polarized liquid crystal molecules are situated within the solid polymer, which crystals align themselves in their electrical field when a specific voltage is applied.

PDLC films are very sensitive to temperature changes. Two competing effects then occur. With rising temperatures, the intrinsic movement of the polarized liquid crystal molecules increases, making their alignment in the electrical field more difficult. However, at the same time, the viscosity of the liquid crystals is greatly reduced, in other words, the liquid crystal molecules can be more readily polarized and aligned in the electrical field. Furthermore, phase transitions occur in the liquid crystal molecules.

As the inventors surprisingly found, at higher temperatures, on the whole, a smaller electrical field and thus a lower voltage are necessary to achieve comparable transparency values and opacity values than with higher maximum output voltages in the lower temperature range. Thus, energy can be saved at elevated temperatures and the PDLC film is protected through the avoidance of high voltages, resulting in increased service life.

LIST OF REFERENCE CHARACTERS 1 voltage source
2 functional element having electrically controllable optical properties
3 supply line
5 thermometer
6 signal line
10 composite pane
11 outer pane
12 inner pane
13a first intermediate layer
13b second intermediate layer
21 active layer of the functional element 5
22 surface electrode of the functional element 5
23 surface electrode of the functional element 5
24 carrier film
25 carrier film
100 device
f frequency
g temperature coefficient
$g_o$ upper temperature coefficient
$g_u$ lower temperature coefficient
P period duration
t time
$t_1$ rise time
T temperature
$T_S$ threshold temperature
U output voltage
$U_{max}$ the maximum amplitude of the output voltage U
$U_{max,o}$ upper maximum amplitude of the output voltage U
$U_{max,u}$ lower maximum amplitude of the output voltage U
$U_{max,k}$ the maximum amplitude of the output voltage U for temperatures T≤$T_S$
X-X' section line
Z enlarged region

The invention claimed is:

1. A device having at least one functional element having electrically controllable optical properties, comprising:
   an electrical energy source having an output voltage U,
   at least one functional element having electrically controllable optical properties, and
   at least two supply lines, by means of which the electrical energy source and the functional element are connected,
wherein the output voltage U has an alternating voltage having
   a frequency f of 40 Hz to 210 Hz,
   a maximum amplitude $U_{max}$ of 24 V to 100 V,
   a slope in the range of the output voltage U between –80% $U_{max}$ and 80% $U_{max}$ of 0.05*$U_{max}$/100 µs to 0.1*$U_{max}$/100 µs and in the range of the output voltage U between 80% $U_{max}$ and –80% $U_{max}$ of –0.05*$U_{max}$/100 µs to –0.1*$U_{max}$/100 µs, wherein a thermometer is arranged on the functional element and the thermometer is coupled to the power supply.

2. The device according to claim 1, wherein the functional element is planar.

3. The device according to claim 1, wherein the functional element is a suspended particle device film or a polymer-dispersed liquid crystal film.

4. The device according to claim 1, wherein the frequency f is from 45 Hz to 105 Hz.

5. The device according to claim 1, wherein the maximum amplitude $U_{max}$ is from 50 V to 75 V.

6. The device according to claim 1, wherein the slope in the range between –100% $U_{max}$ to –80% $U_{max}$ as well as between 80% $U_{max}$ to 100% $U_{max}$ is less than 0.05*$U_{max}$/100 µs and between 100% $U_{max}$ to 80% $U_{max}$ as well as between –80% $U_{max}$ to –100% $U_{max}$ is greater than –0.05*$U_{max}$/100 µs.

7. The device according to claim 1, wherein the slope in the range between –90% $U_{max}$ and –80% $U_{max}$ as well as in the range from 80% $U_{max}$ to 90% $U_{max}$ is from 0.05*$U_{max}$/100 µs to 0.1*$U_{max}$/100 µs.

8. The device according to claim 1, wherein the slope in the range between –100% $U_{max}$ and –90% $U_{max}$ as well as in the range from 90% $U_{max}$ to 100% $U_{max}$ is less than 0.05*$U_{max}$/100 µs.

9. The device according to claim 1, wherein the functional element is arranged inside a composite pane.

10. A method for controlling the device according to claim 1, wherein
   a) a temperature T is measured at the thermometer, and
   b) the maximum amplitude $U_{max}$ of the output voltage U is adapted to the temperature, wherein from a certain threshold temperature $T_S$ as the temperature T increases at the thermometer, the maximum output voltage $U_{max}$ is lowered and up to a certain threshold temperature $T_S$ as the temperature T drops, the maximum output voltage $U_{max}$ is increased.

11. A method for controlling a device according to claim 1, wherein the temperature T is measured at the thermometer and the maximum amplitude $U_{max}$ of the output voltage U is adapted as a function of the temperature T, wherein
   for T<$T_S$: $U_{max}$=$U_{max,k}$=constant at 50 V<$U_{max,k}$<75 V and
   for T>$T_S$: 50 V–1.5 V/° C.*(T–$T_S$)<$U_{max}$<75 V–0.5 V/° C.*(T–$T_S$)
   and $T_S$=constant at 40° C.<$T_S$<60° C.

12. The method according to claim 11, wherein
   for T<$T_S$: $U_{max}$=$U_{max,k}$=constant at 50 V<$U_{max,k}$<75 V and
   for T>$T_S$: $U_{max}$=$U_{max,k}$+g (T–$T_S$) with –1.5 V/° C.<g<–0.5 V/° C.
   and $T_S$=constant at 40° C.<$T_S$<60° C.

13. The method according to claim 11, wherein
   for T<$T_S$: $U_{max}$=$U_{max,k}$=constant at 60 V<$U_{max,k}$<70 V and
   for T>$T_S$: $U_{max}$=$U_{max,k}$+g (T–$T_S$) with
      g=constant and –1.5 V/° C.<g<–0.5 V/° C. and
   $T_S$=constant at 40° C.<$T_S$<60° C.

14. A method comprising utilizing a device according to claim 1 for controlling a functional element in a vehicle on water, on land, or in the air, or in an interior glazing or an exterior glazing of a building, as a sun screen or as a privacy screen.

15. The device according to claim 4, wherein the frequency f is from 49 Hz to 69 Hz.

16. The device according to claim 5, wherein the maximum amplitude $U_{max}$ is from 60 V to 70 V.

17. The device according to claim 9, wherein the thermometer is arranged inside the composite pane.

18. The method according to claim 14, wherein the device includes a windshield or a roof panel of a motor vehicle.

* * * * *